No. 832,846. PATENTED OCT. 9, 1906.
J. J. CONSTANZER.
STAIR ROD FASTENER.
APPLICATION FILED APR. 6, 1906.
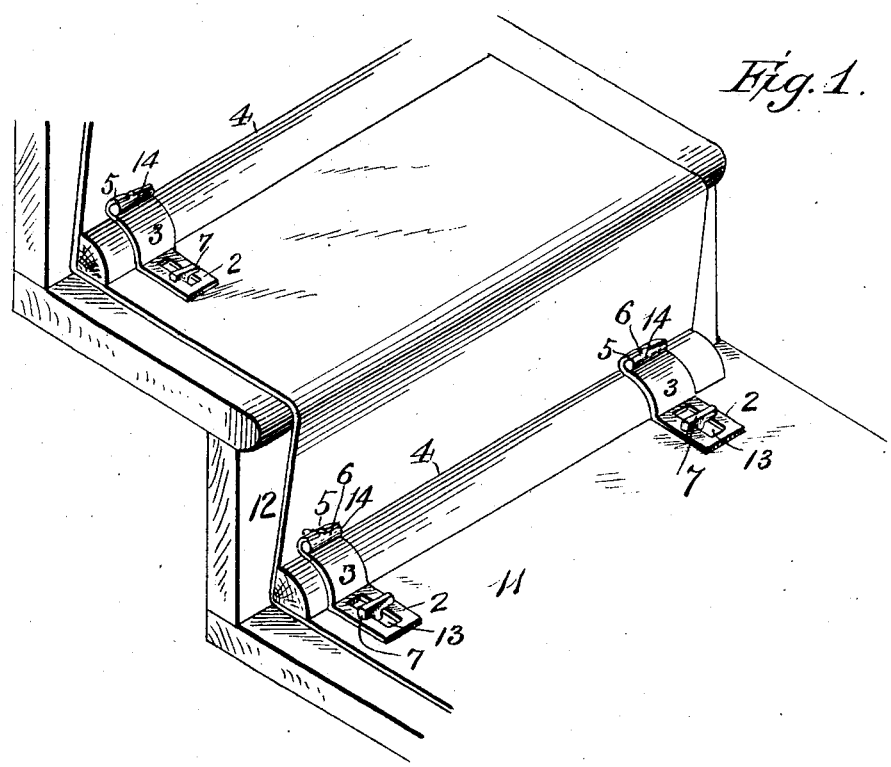
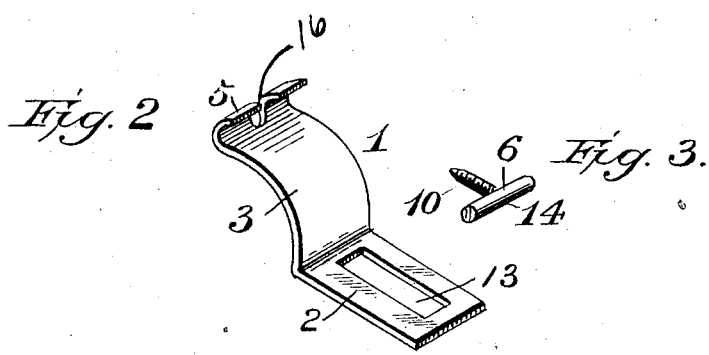
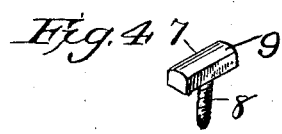
Witnesses
F. L. Orrand
H. K. Bonell
Inventor
Joseph J. Constanzer
By Wm. E. Boulter,
Attorney

UNITED STATES PATENT OFFICE.

JOSEPH J. CONSTANZER, OF ALLENTOWN, PENNSYLVANIA.

STAIR-ROD FASTENER.

No. 832,846.	Specification of Letters Patent.	Patented Oct. 9, 1906.

Application filed April 6, 1906. Serial No. 310,249.

*To all whom it may concern:*

Be it known that I, JOSEPH J. CONSTANZER, a citizen of the United States, residing at Allentown, in the county of Lehigh and State of Pennsylvania, have invented certain new and useful Improvements in Stair-Rod Fasteners, of which the following is a specification.

My invention relates to stair-rod fasteners, and among the objects in view is to provide a fastener of this character which shall be of extremely simple and inexpensive construction and efficient in use; and the invention consists in the novel construction, arrangement, and combination of parts, as hereinafter fully described, illustrated in the drawings, and pointed out in the appended claims.

In the drawings, Figure 1 is a perspective view showing the application of my invention. Fig. 2 is a perspective view of one of my fasteners detached. Fig. 3 is a similar view of one of the securing-studs, and Fig. 4 is a similar view of another stud which I employ.

1 indicates my improved fastener, which may be constructed of any suitable or desirable metal, though I preferably employ a springy metal, such as spring-steel or brass, and the same may be nickel-plated, if desired.

My fastener comprises a flat base portion 2, designed to be clamped or screwed in any desired manner to the tread of a stairway, and a curved clamping portion 3, which is designed to clamp directly against the stair-rod 4 to hold it securely in position, said portion 3 terminating in a reversely-curved lip portion 5, designed to engage with the headed stud 6.

The fastener may be secured to the tread of the stairway by any suitable or desired means—as, for instance, by means of a stud or bolt 7, having a threaded shank 8 and a head 9. The shank is adapted to pass through an opening in the base portion 2 and screw within the tread 11 until the head 9 seats securely down on said base. The portion 5 is adapted to engage with the stud 6, which has a threaded shank 10, which screws within the riser 12 of the stairway. The shank 10 may be made plain instead of threaded and the stud simply driven into the riser.

For the purpose of adapting the fastener to be readily removed from the tread without necessitating the stud 7 being entirely detached and for adapting the device to be adjustable to different thicknesses of stair-rods I provide the base 2 with a slot 13, extending longitudinally thereof and of a width and length sufficient to at least permit the head 9 to pass therethrough. The slot 13 permits the fastener to be adjusted in a direction longitudinally of the base. By simply loosening the stud slightly and bringing the head in line with the slot the fastener can be detached from the said stud.

The shape of the head 9 might be varied somewhat, and I do not desire to be restricted to the shape shown.

The stud 6 has an elongated head 14, which is engaged by the portion 5 of the fastener, and I preferably make the head round in transverse section whereby to facilitate the slipping of the fastener into position and the engagement of the portion 5 with the said head. The shank of the stud 6 might be made plain instead of being threaded.

While I have shown the application of my device to a stair-rod 4, which is of quarter-round section, and the portion 3 shaped to correspond therewith, yet it will be understood that I do not desire to confine the application of my device to a stair-rod of the described shape nor to the said specific shape of the portion 3, since the rod might be round or of varying shapes and the portion 3 made of a shape to correspond therewith or given any other shape so long as it would be adapted to come into clamping contact with the rod to hold it in position.

In practice I would employ two of my fasteners, one near each end of the rod, as shown.

The fasteners may be readily removed, so as to release the rod by first loosening the studs 7 and raising the base 2 until the heads of the studs have passed through the slots 13 and then sliding the fasteners endwise until the portions 5 release the heads of studs 6.

When a rod is to be secured in position, it is placed in the angle formed by the tread and riser and the fasteners then slipped into position, with the portions 5 engaging the studs 6 and the shank of the studs 7 passed through the slots 13 and screwed into the tread 4 until the heads seat firmly down on the base 2 with the said heads transverse to the slots 13.

The portion 5 is provided with a slot 16 to render said portion more elastic or springy.

Instead of arranging the device so that the base 2 seats upon the tread the parts could be reversed in position with the base seating against the riser.

While I have shown my fasteners as being arranged upon the carpet, it will be understood that I may in practice arrange these fasteners beyond the edges of the carpet and not lying upon the same.

What I claim is—

1. A stair-rod fastener comprising a base adapted to seat upon the tread of a stairway, a clamping portion adapted to clamp against a stair-rod, means for detachably securing the clamping portion to a riser, and means for securing the base to a tread and permitting the adjustment of said base in a direction longitudinally of the latter.

2. As a new article of manufacture a stair-rod fastener, comprising a base having a longitudinal slot, and a clamping portion terminating in a lip.

3. A stair-rod fastener comprising a base adapted to seat upon the tread of a stairway and having a slot, a clamping portion adapted to clamp against a stair-rod and terminating in a lip portion, and a headed stud the head of which is adapted to engage with said lip portion.

In testimony whereof I affix my signature in presence of two witnesses.

JOSEPH J. CONSTANZER.

Witnesses:
   AUG. W. HENDRICKS,
   JOHN E. HOXWORTH.